൧

2,870,181
WATER SOLUBLE ORGANOTITANIUM COMPOUNDS AND PROCESS OF PREPARATION

Comer Drake Shacklett, Roselle, N. J., assignor to E. I. du Pont de Nemours and Company, Wilmington, Del., a corporation of Delaware No Drawing. Application February 17, 1954
Serial No. 411,020

16 Claims. (Cl. 260—429.5)

This invention relates to chemical compounds and more particularly to water-soluble titanium compounds which are stable in neutral, weakly, acidic and alkaline aqueous solutions. Still more particularly it relates to polymeric organic titanium-containing compounds. The invention further relates to the preparation of such compounds.

Various titanium compounds, including inorganic as well as organic titanium compounds, have been found to be useful as gelling or crosslinking agents for hydroxylated polymeric materials. The inorganic titanium compounds, such as titanyl sulfate and titanyl chloride, require the use of such high concentrations of acid to prevent their hydrolysis so that their solutions have pH's 3 to 4 or lower. This has prevented the use of these solutions for gelling and hardening purposes in various systems. Thus, in the preparation of photographic layers from hydroxyl polymer compositions which contain color formers, the acid in the gelling solution has a deleterious effect on the color formers.

Certain organic titanium compounds have been proposed as gelling agents but they have similar disadvantages, while certain other organic titanium compounds require a high pH in order to produce adequate gelling. This strong basicity has prevented their use in the gelling of photographic silver halide layers and other layers of photographic films and papers because it gives rise to emulsion instability and high fog.

An object of this invention is to provide a new class of organic titanium compounds. Another object is to provide water-soluble organic titanium compounds. Yet another object is to provide such compounds which are stable in weakly acid, weakly basic, and neutral aqueous solutions. A further object is to provide such compounds which are good gelling agents for hydroxyl polymers, e. g., polyvinyl alcohol and its partial esters and acetals, cellulose derivatives, polymeric carbohydrates, etc., in weakly acidic, weakly basic and neutral solutions. A still further object is to provide such compounds which do not have a deleterious effect on photographic emulsions. Still further objects will be apparent from the following description of the invention.

It has been found that organic titanium compounds having the above characteristics can be prepared by reacting, in the liquid phase, one mol of an orthotitanate of the general formula $Ti(OR)_4$, where R is an alkyl radical of 1 to 8 carbon atoms, with ½ to 4 mols of a saturated aliphatic mono-, dicarboxylic or tricarboxylic acid of 2 to 6 carbon atoms having a hydroxyl group in the α-position to any carboxylic acid group thereof. The reaction may be carried out advantageously at a temperature between 15° C. and 60° C., but is preferably carried out at room temperature. When the reactants are liquids, no solvents or diluents are necessary. However, it is preferred to use solvents for the reactants and these are non-solvents for, and inert with respect to, the reaction products. Suitable solvents include acetone, diethyl ether, etc.

The reaction takes place rapidly and the product precipitates immediately. The precipitated product is filtered and washed with a suitable solvent and dried.

The organic titanium products of this invention are white, amorphous substances which are quite soluble in water and in aqueous methanol, ethanol and other water-soluble alcohols. The analyses of these substances indicate that they contain alkyl groups from the tetraalkyl titanates, as well as residues from the hydroxyl-substituted acids. They are polymeric substances, i. e., they contain more than one atom of titanium per molecule. Their structure is not known, but due to the hexa-covalency of titanium are believed to be complex condensation products. The products are soluble in water to the extent of 500 to 600 grams per liter of solution. They are also soluble in acid solutions of pH 4 to 7 and in basic solutions of pH 7 to 8, to about the same extent.

The invention will be further understood, but is not intended to be limited by the following examples wherein the parts stated are parts by weight.

Example I

To 285 parts of tetraisopropyl titanate dissolved in 1000 parts of acetone is added 180 parts of lactic acid dissolved in 1000 parts of acetone. The mixture is mixed thoroughly and the white, insoluble precipitate filtered, washed three times with 500 parts of acetone and air-dried. There is obtained 200 to 250 parts of the product, whose analysis was:

$$C=32.3\%$$
$$H=4.9\%$$
$$Ti=15.1\%$$

This material forms stable solutions in water whose pH can be adjusted with alkali to as high as 7.5 without precipitation of titanium compounds.

Example II

To 285 parts of tetraisopropyl titanate dissolved in 1000 parts of acetone there is added 176 parts of tartaric acid dissolved in 5000 parts of warm acetone. The mixture is stirred thoroughly and filtered. The insoluble, white precipitate is washed three times with 500 parts of acetone and air-dried.

There is obtained 200 to 250 parts of this substance, whose analysis was:

$$C=19.2\%$$
$$H=3.6\%$$
$$Ti=14.6\%$$

Example III

The procedure of Example I was repeated with 341 parts of tetrabutyl titanate instead of 285 parts of tetraisopropyl titanate, to give a product whose analysis was:

$$C=36.4\%$$
$$H=5.7\%$$
$$Ti=13.8\%$$

Example IV

The procedure of Example I was repeated with 569 parts of tetra(2-ethylhexyl) titanate instead of 285 parts of tetraisopropyl titanate and 2000 parts of diethylether instead of 2000 parts of acetone, to give a product whose analysis was:

$$C=36.4\%$$
$$H=6.0\%$$
$$Ti=14.4\%$$

Example V

The procedure of Example I was repeated with 152 parts of glycolic acid instead of 180 parts of lactic acid. There were obtained 150 to 200 parts of a white amorphous product which forms stable solutions in water when the pH is adjusted to between 5 and 7.5.

In place of the tetraalkyl titanates given in the examples there may be used other tetraalkyl titanates, such as tetramethyl titanate, tetraethyl titanate, tetrapropyl titanate, the various tetrabutyl titanates, the various tetraamyl titanates, the various tetrahexyl titanates, the various tetraheptyl titanates, the various tetraoctyl titanates, etc.

Similarly, in place of lactic acid, glycolic acid, or tartaric acid shown in the examples there may be used in the proportions given above other hydroxy-aliphatic acids of the kind stated above, including α-hydroxybutyric acids, glyceric acid, citric acid, α-hydroxypropionic acid, etc.

Instead of the acetone or diethyl ether used in the examples as solvent or diluent there may be used such other organic liquids, e. g., methyl ethyl ketone, diisopropyl ether, methyl propyl ether, ethyl propyl ether, dioxane, and ethyl acetate.

In addition to being useful gelling agents for starch and polyvinyl alcohol the substances of this invention are equally effective for gelling other polyhydroxylated hydrophilic, partially-hydrolyzed polyvinyl acylates, e. g., polyvinyl acetate, polyvinyl propionate and polyvinyl butyrate, partially acetalized polyvinyl acetals including the partial acetals of polyvinyl alcohol with formaldehyde, acetaldehyde, propionaldehyde, butyraldehyde, benzaldehyde, tolualdehyde, p-hydroxybenzaldehyde, o-sulfobenzaldehyde, m-aminobenzaldehyde, p-dimethylaminobenzaldehyde and its quaternary ammonium salts and the color-forming polyvinyl acetals described in Dorough and McQueen U. S. P. 2,310,943, and other hydroxylated polymeric material in which hydroxyl groups occur either on adjacent or on alternate carbon atoms.

An advantage of this invention resides in the fact that it provides a new class of water-soluble organo-titanium compounds. Another advantage is that the compounds are soluble in neutral, weakly acidic and weakly basic solutions. A further important advantage of the new organo-titanium compounds is that they can be safely used in photographic silver halide emulsions. A still further advantage is that the compounds can be prepared readily. Still other advantages will be apparent from the above description of the invention.

The embodiments of the invention in which an exclusive property or privilege is claimed are defined as follows:

1. A water-soluble organo-titanium compound comprising the reaction product of one mol of an ortho titanate of the formula $Ti(OR)_4$ wherein R is an alkyl radical of 1 to 8 carbon atoms, with ½ to 4 mols of a saturated aliphatic carboxylic acid of 2 to 6 carbon atoms containing only carbon, hydrogen and oxygen atoms and having a hydroxy group in the alpha-position thereof, which organotitanium compound is soluble in water to the extent of at least 500 grams per liter of solution.

2. A water-soluble organo-titanium compound consisting of the reaction product of one mol of an ortho titanate of the formula $Ti(OR)_4$ wherein R is an alkyl radical of 1 to 8 carbon atoms, with ½ to 4 mols of an α-hydroxy fatty acid of 2 to 6 carbon atoms, which organotitanium compound is soluble in water to the extent of at least 500 grams per liter of solution.

3. A water-soluble organo-titanium compound consisting of the reaction product of one mol of an ortho titanate of the formula $Ti(OR)_4$ wherein R is an alkyl radical of 1 to 8 carbon atoms, with 2 mols of lactic acid, which organotitanium compound is soluble in water to the extent of at least 500 grams per liter of solution.

4. A water-soluble organo-titanium compound consisting of the reaction product of one mol of an ortho titanate of the formula $Ti(OR)_4$ wherein R is an alkyl radical of 1 to 8 carbon atoms, with 1 mol of tartaric acid, which organotitanium compound is soluble in water to the extent of at least 500 grams per liter of solution.

5. A water-soluble organo-titanium compound consisting of the reaction product of one mol of tetraisopropyl titanate with 2 mols of lactic acid, which organotitanium compound is soluble in water to the extent of at least 500 grams per liter of soluition.

6. A water-soluble organo-titanium compound consisting of the reaction product of one mol of tetraisopropyl titanate with 1 mol of tartaric acid, which organotitanium compound is soluble in water to the extent of at least 500 grams per liter of solution.

7. A water-soluble organo-titanium compound consisting of the reaction product of one mol of tetrabutyl titanate with 2 mols of lactic acid, which organotitanium compound is soluble in water to the extent of at least 500 grams per liter of solution.

8. A water-soluble organo-titanium compound consisting of the reaction product of one mol of tetra(2-ethylhexyl) titanate with 2 mols of lactic acid, which organotitanium compound is soluble in water to the extent of at least 500 grams per liter of solution.

9. The process which comprises reacting, in an organic liquid phase at a temperature between 15° C. and 60° C. one mol of an otho titanate of the formula $Ti(OR)_4$ wherein R is an alkyl radical of 1 to 8 carbon atoms, with ½ to 4 mols of a saturated aliphatic carboxylic acid of 2 to 6 carbon atoms containing only carbon, hydrogen and oxygen atoms and having a hydroxyl group in the alpha-position thereof and recovering a water-soluble organo-titanium compound.

10. A process as set forth in claim 9 wherein an organic solvent for the reactants is present.

11. A process as set forth in claim 10 wherein said solvent is acetone.

12. A process as set forth in claim 10 wherein said solvent is diethyl ether.

13. The process which comprises reacting in acetone solution at a temperature between 15° C. and 60° C. one mol of tetraisopropyl titanate with 2 mols of lactic acid and recovering the polymeric organo-titanium compound formed thereby.

14. The process which comprises reacting in acetone solution at a temperature between 15° C. and 60° C. one mol of tetrabutyl titanate with 1 mol of tartaric acid and recovering the polymeric organo-titanium compound formed thereby.

15. The process which comprises reacting in acetone solution at a temperature between 15° C. and 60° C. one mol of tetrabutyl titanate with 2 mols of lactic acid and recovering the polymeric organo-titanium compound formed thereby.

16. The process which comprises reacting in acetone solution at a temperature between 15° C. and 60° C. one mol of tetra(2-ethylhexyl) titanate with 2 mols of lactic acid and recovering the polymeric organo-titanium compound formed thereby.

References Cited in the file of this patent

UNITED STATES PATENTS 2,621,195   Haslam _____ Dec. 9, 1952